United States Patent [19]
Jones et al.

[11] 3,725,919
[45] Apr. 3, 1973

[54] METHOD AND APPARATUS FOR PLOTTING VESSEL POSITION

[75] Inventors: Jerry J. Jones; Joe C. Lochridge, both of Houston, Tex.

[73] Assignee: Brown & Root, Inc., Houston, Tex.

[22] Filed: Dec. 19, 1969

[21] Appl. No.: 886,562

[52] U.S. Cl. ........343/6.5 R, 343/5 CM, 343/112 PT, 346/8
[51] Int. Cl. ........G01d 9/10, G01s 5/14, G01s 11/00
[58] Field of Search..343/112 PT, 112 C, 112 D, 6.5, 343/6.5 LC, 15, 5 CM; 346/8; 61/72.3

[56] References Cited

UNITED STATES PATENTS

| | | | |
|---|---|---|---|
| 3,573,819 | 4/1971 | Mason et al. | 343/6.5 R |
| 3,293,599 | 12/1966 | Nay et al. | 346/8 X |
| 3,114,912 | 12/1963 | Tooley | 343/112 PT |
| 3,299,539 | 1/1967 | Leiber | 346/8 |
| 3,160,851 | 12/1964 | Ramsayer et al. | 346/8 X |
| 2,804,616 | 8/1957 | Pierce | 343/112 PT |
| 2,569,328 | 9/1951 | Omberg | 343/112 PT |
| 3,553,691 | 1/1971 | Lassiter | 343/15 |

*Primary Examiner*—Malcolm F. Hubler
*Attorney*—Burns, Doane, Swecker and Mathis

[57] ABSTRACT

A pipelaying barge is controlled in response to the error between the actual barge position and a desired pipeline route or course illustrated on a strip map. Although the desired pipeline route is not a straight line on a chart, the strip map illustrates the pipeline as a relatively straighter route or course. The straighter route or course strip map is obtained by plotting the route or course on a chart where relative rotation between adjacent gridline segments has been effected so as to cause the plot of the route on the reoriented gridline segments to assume a straighter form.

16 Claims, 8 Drawing Figures

INVENTORS
JERRY J. JONES and
JOE C. LOCHRIDGE
BY
Burns, Doane, Benedict, Swecker & Mathis
ATTORNEYS

METHOD AND APPARATUS FOR PLOTTING VESSEL POSITION

The present invention relates to a method and apparatus for determining and recording in real time the actual position of a vessel relative to a predetermined course.

With the spiraling growth and expansion of the petroleum industry, an increasing demand for highly accurate measurements and records, particularly in offshore exploration, surveying, construction, and pipelaying has developed. These types of operations may involve the exploration or mapping of the ocean bottom at predetermined locations or over predetermined courses, the construction of towers and other structures at particular locations, or the precise laying of a pipeline along a predetermined route. In each case, a precise record of the actual course followed or the precise location of the construction or exploration site is of great importance.

For example, in pipelaying operations it may be necessary to follow a predetermined pipeline route with extreme accuracy because of the severely limited extent of the right-of-way on either side of the route and because of the existence of obstructions on the ocean floor. Such problems may give rise to a requirement for very close tolerances in following a course which can vary erratically. In addition, an accurate record of the actual position of the pipeline on the ocean floor may be required for job certification where the contract calls for specific tolerances to be kept or for future reference in locating the pipeline and its associated fittings for maintenance and/or repair.

At least two major problems may be encountered in determining and plotting the position of a vessel such as a pipelaying barge relative to a desired course with the accuracy required by present standards. The actual vessel position must be accurately determined and translated into a form conducive to both rapid and accurate plotting, preferably with little or no intervention by the operator. Additionally, the resultant chart must be plotted to a large enough scale to make the information plotted thereon meaningful as a record of pipeline position.

While the development of more accurate position determining systems has facilitated the determination of actual vessel position at sea, there may be inherent inaccuracies or limitations which seriously hamper their application where extreme accuracy is required. Acoustic systems, for example, are severely limited by the depth of the water in which they are being utilized and are quite limited in range. Radio navigation systems, while providing the requisite range capabilities for most of the above applications, are limited by variations in atmospheric conditions and inherent calibration inaccuracies. A further difficulty in the use of such systems on large offshore vessels is the perturbations resulting from antenna and vessel superstructure interaction.

Further, of the above types of position determining systems, the output signals, where provided, are not conducive to direct plotting, particularly where the plot must be adapted to immediately convey intelligible information to an operator or navigator. Thus, in order to meet the present demands for accuracy and speed, the position determining and plotting system should be capable of correcting errors due to system limitations and inaccuracies and should further be capable of translating the position information into an accurate plot relative to a desired course or position to provide both the required record and navigation information.

Where the desired course is perfectly straight from beginning to end, the problem of determining actual vessel position and translating this information into the required form with accuracy and speed still exists. The chart, however, may be easily plotted to a meaningful scale, since a relatively narrow, elongated chart having the desired course plotted as a straight line centrally disposed thereon may be utilized. Since under these ideal conditions the desired course never varies, there remains an equal distance on either side of the desired course on the chart in which the actual position may be plotted without straying off the chart.

However, where the desired course changes in direction, the distances on either side of the desired course plot on the chart eventually become greatly unequal, and the desired course line may itself run off the chart. This may, of course, be compensated for by reducing the plotting scale factors to prevent these undesirable results. However, a reduction in plotting scale factors may lead to a highly inaccurate record of the pipeline position. Thus, the chart may be highly ineffectual as a future reference in locating the underwater pipeline or the construction or exploration site.

Also encountered in the laying of the pipeline is the problem of the reproducibility of the actual course at a later date, for example, for purposes of maintenance and/or repair. Reproducibility of the actual course, i.e. the ability to navigate the same course followed earlier, is an extreme problem offshore. If, for example, buoys are laid out along a predetermined course and followed during the pipelaying operation, course variations due to the displacement of the buoys by wind and current may result regardless of the accuracy with which the buoys are followed. Such variations do not always show up on the plot of the pipeline route. Since the buoys are normally removed upon completion of the pipelaying operation, the resultant records may be only generally indicative of the position of the pipeline.

It is therefore an object of the present invention to provide a novel method and system for accurately and rapidly determining and plotting the actual position of an offshore vessel.

It is another object of the present invention to provide a novel method and system for accurately and rapidly determining and plotting the actual course of a pipelaying barge relative to a desired pipeline route.

It is yet another object of the present invention to provide a novel method and system for correcting and translating vessel position information into an accurate and usable plot of actual position.

It is a further object of the present invention to provide a novel method and system for plotting the actual course of a vessel relative to a desired course on a relatively narrow, elongated chart, without having the desired course stray from the confines of the chart, irrespective of the plotting scale factors utilized.

It is yet a further object of the present invention to provide a novel method and system for providing a reproducible record of the location of an underwater pipeline.

It is still a further object of the present invention to provide a novel method and apparatus for navigating a vessel with precision relative to a predetermined course.

These and other objects and advantages of the present invention will become obvious to one skilled in the arts to which the invention pertains from a perusal of the following detailed description when read in conjunction with the attached drawings.

DESCRIPTION OF THE OVERALL SYSTEM

Figure 1:
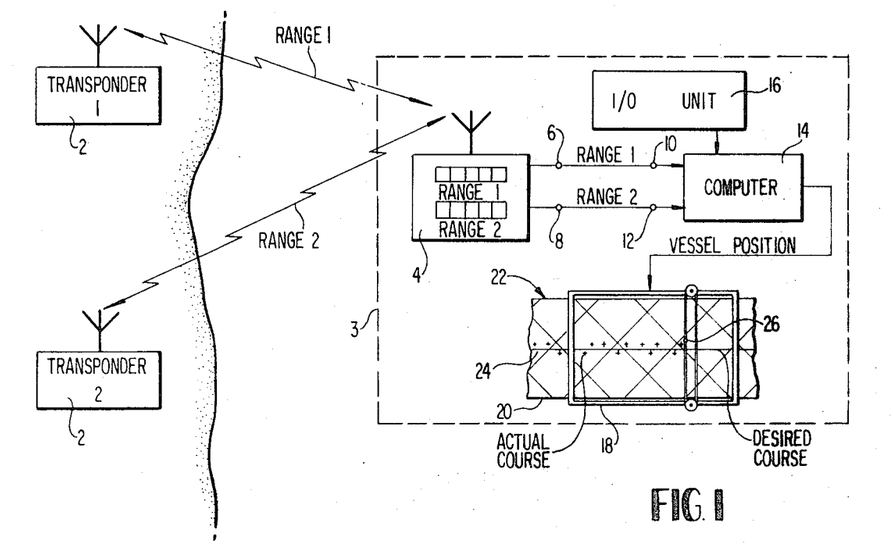
FIG. 1 is a functional block diagram of the overall system of the present invention.

Referring to FIG. 1, the position plotting system of the present invention is illustrated in a functional block diagram. A plurality of transponders 2 may be provided at predetermined geographical locations, preferably on shore and preferably at elevated positions relative to sea level. The vessel 3 may be provided with an interrogator unit 4, a computer 14 and a plotter 18.

The interrogator unit 4 transmits a signal at predetermined intervals, e.g. 1 second intervals, to selectively trigger each of the transponders 2 on shore. Upon receipt of the transmitted interrogator signal, the transponders 2 are triggered and transmit a high frequency signal, preferably in the microwave range, e.g. 3,000 megahertz, which is received by a receiver in the interrogator unit 4.

The interrogator unit 4 determines the ranges from the vessel 3 to each of the transponders 2 by measuring the time lapse between the initiation of the interrogator signals and the receipt of the transponder signals, for example, by conventional pulse counting or phase comparison techniques. The ranges thus calculated may be displayed at the interrogator unit 4 and may additionally be provided at output terminals 6 and 8 in a coded form convenient for use in a computer, e.g. binary coded decimal.

The range values provided at the output terminals 6 and 8 of the interrogator unit 4 may be applied to the input terminals 10 and 12, respectively, of a computer 14. The computer 14 may be a general purpose digital computer and, for example, may be supplied by way of a conventional input/output unit 16 with data as to the desired course coordinates, atmospheric refractivity values, transponder coordinates, transponder height information, barge antenna height information, the calibration factors of the range measurement system, and various scaling factors and plotter information. The range values and the supplied data may then be utilized to compute and plot vessel position in real time as will subsequently be described.

The computer 14 may be programmed to utilize the antenna and transponder height information, the refractivity information, the transponder latitude information and the microwave range measurement calibration constants to calculate range values corrected to the plane of a predetermined navigational coordinate system, for example, the horizontal plane when using the Lambert Conical Orthomorphic Projection system. Since the navigational coordinates of each of the transponders 2 are known, the computer 14 may, by conventional triangulation techniques using the corrected range values, calculate the position of the vessel 3 at any time relative to the predetermined navigational coordinate system.

Having determined the position of the vessel, the computer 14 may be programmed to utilize the course data or grid line orientation data, the scale factor information, and the plotter step information in conjunction with the computed vessel position to generate control signals to position the chart 20 and the pen or marker 26 of an incremental digital plotter 18.

In a particular example wherein the vessel is a pipelaying barge, the plotter 18 may be provided with a web or elongated chart 20 having computer plotted navigational grid lines 22 of the predetermined navigational coordinate system, and a desired course line 24 representing a desired pipeline route preplotted thereon. As previously described, the plotter control signals generated by the computer 14 are applied to the plotter 18 to incrementally position the chart 20 and the marker or pen 26. The actual barge position relative to the preplotted grid system 22 may thereby be plotted providing an accurate record of the barge position, and thus, the position of the pipeline relative to the desired pipeline route.

Additionally, any error between the coordinates of the actual barge position and the desired course may be determined by the computer 14 and utilized to develop course correction signals. Alternatively, the operator may observe the error on the chart and manually correct the barge heading.

MICROWAVE RANGE MEASUREMENT SYSTEM

Figure 2:
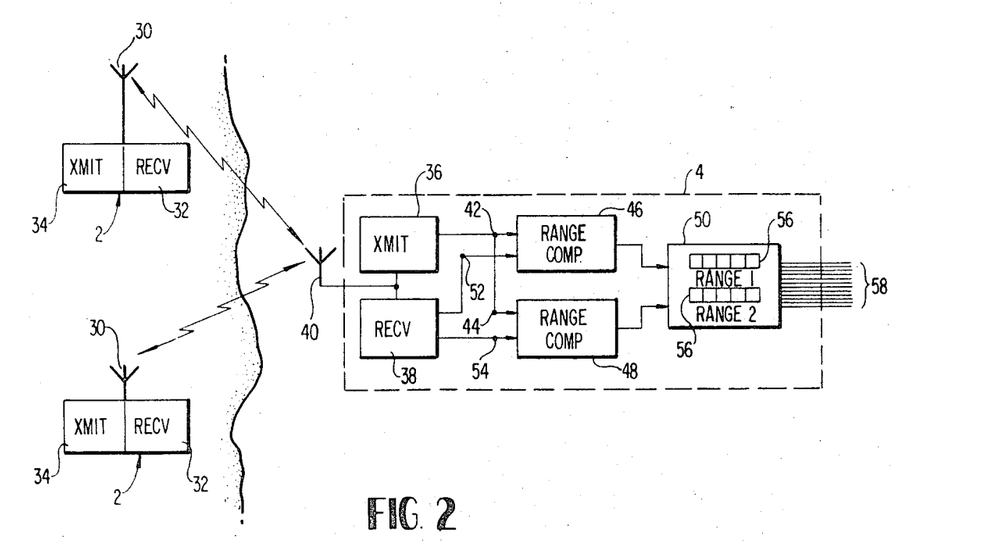
FIG. 2 is a functional block diagram of the range measurement portion of the system illustrated in FIG. 1.

Referring now to FIG. 2, the microwave range measurement system utilized in the barge position plotting system of the present invention, preferably a conventional Cubic "Autotape" model DM 40 manufactured by the Cubic Corporation, comprises a plurality of transponders 2 and an interrogator unit 4.

The transponders 2 may each be provided with an antenna 30 coupled to both a receiver 32 and a transmitter 34, which are interconnected to provide for the keying of the transmitter 34 in response to a signal of a predetermined frequency at the receiver 32.

The interrogator unit 4 may likewise be provided with a transmitter 36 and a receiver 38, both of which may be coupled to an antenna 40. The transmitter 36 may also be connected to the input terminals 42 and 44 of range computers 46 and 48, respectively, the output signals of which may be applied to a read-out unit 50. In addition, the output signals from the receiver 38 may be applied to the input terminals 52 and 54 of the range computers 46 and 48, respectively.

In operation, the transmitter located in the interrogator unit 4 on the vessel 3 is keyed and a high frequency signal, e.g. 3,000 megahertz, is transmitted to the transponders 2. At the same time, the keying pulse is applied to the range computers 46 and 48. The transmitted signal is received by the receivers 32 of the transponders 2, thereby keying each of the transmitters which transmit a microwave signal, each modulated in a different manner. The signals from the transmitters 34 are received by the receiver 38 of the interrogator unit 4 and these signals, being modulated in a different manner, may be separated and directed to a particular range computer associated with a particular transponder 2.

Upon receipt of the signals from the receivers 38, the range computers 46 and 48 may determine, by conventional phase comparison techniques, the time interval from the initiation of the transmitted signal at the transmitter 36 to the receipt of a particular transmitted signal from the transponders 2. These time intervals may be divided by an appropriate constant related to the propagation velocity of microwave energy in the atmosphere to provide uncorrected slant ranges from the interrogator unit 4 to each of the transponders 2.

The uncorrected slant ranges may then be displayed visually at the visual indicator 56 of the read-out unit 50, and may additionally be provided as coded output signals, e.g. binary coded decimal, at appropriate output terminals 58.

THE COMPUTER

The computer 14 may be any suitable conventional general purpose digital computer programmed in a conventional manner to perform the desired real time functions. For example, the Hewlett Packard Model No. 2115A has been utilized with satisfactory results.

The functions performed by the computer desirably include the correction of transponder ranges, the computation of actual barge position in a predetermined navigational coordinate system from the corrected ranges, and the computation and generation of plotter command signals. Additionally, it may be desirable to read several range values at each predetermined interval and perform conventional ambiguity checks and averaging or smoothing techniques to provide for greater reliability and accuracy of range data. To facilitate an understanding of these functions as illustrated in FIG. 3, common nomenclature will be hereinafter used to designate both the computer signals and the physical quantities which the signals represent.

Figure 3:
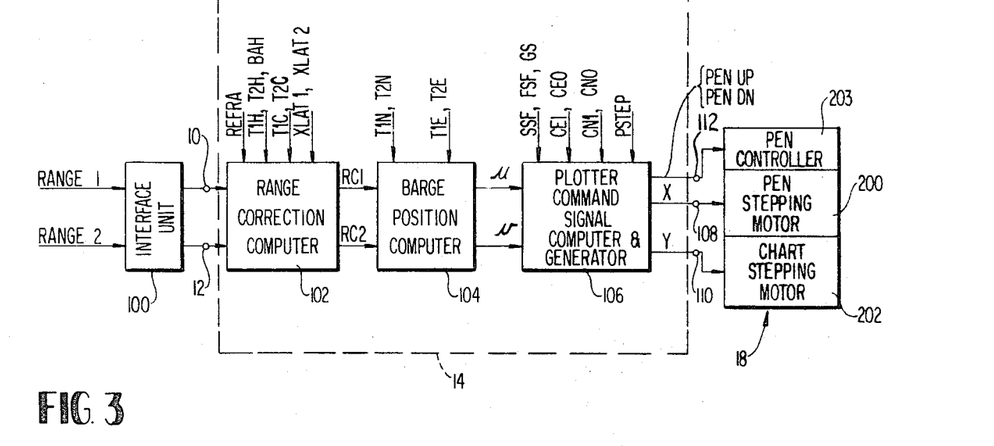
FIG. 3 is a functional block diagram of the computing portion of the system illustrated in FIG. 1.

Referring now to FIG. 3, the ranges R1 and R2 from the barge to the transponders may be applied by way of a conventional interface unit 100 to the input terminals 10 and 12 of the computer 14. The interface unit 100 may be required to provide compatibility of the logic signal levels of the interrogator unit 4 to the logic signal level requirements of the computer 14.

For example, when using the Hewlett Packard Model No. 2115A computer and the Cubic "Autotape" microwave range measurement system Model DM40, it is necessary to change the positive 6-volt logic output signals from the range measurement system to a negative 4-volt logic level signal required by the computer. Such interface units are entirely conventional, are well known in the art and may, for example, comprise a diode matrix or transistor inverter circuits connected to the proper bias voltage levels.

The computer program and other relevant data may be supplied to the computer 14 by way of a conventional input/output unit (not shown), for example, a Hewlett Packard Teleprinter, Model HP2752A. The teleprinter is especially suitable since the program and data may be read into the computer 14 from a punched tape and stored in computer memory or alternatively may be read into memory as required by the computer 14 to perform particular operations. This may considerably reduce the computer memory space required during a particular operation, e.g. during the plotting of actual vessel position relative to a particular course segment, since only that data related to the particular operation need be stored in memory.

In addition, the computer 14 may be programmed to command the printing of range or other data for specific points along the actual course. For example, in laying pipeline, it may be advantageous to record the ranges to each of the transponders whenever a valve or fitting is installed in the line.

This range information is, of course, available from the coordinates of the position plotted on the chart and the known coordinates of the transponders which may not appear on the chart. However, the reading of the coordinates from the chart may involve interpolation and therefore may not provide the extreme accuracy to precisely locate a particular fitting. With a directly readable record of the ranges to each of the transponders from a particular fitting, a repair or maintenance vessel equipped with range measurement equipment may locate the fitting with precision.

The first function performed by the computer may be that of correcting the ranges R1 and R2 for errors due to the refractivity of the atmosphere. Adjustments may also be made for the calibration factors of the microwave ranging system. Since the ranges R1 and R2 are, in fact, slant ranges it may also be desirable to correct the ranges R1 and R2 to a single horizontal reference plane.

To facilitate an understanding of the overall computer operation, the means for performing the various computer functions have been separated but may be in fact performed by a single means. The range correction computer 102 may be provided with signal data representative of the uncorrected ranges R1 and R2 the refractivity of the atmosphere REFRA, the transponder calibration factors T1C and T2C, the height of the transponders above sea level T1H and T2H, the height of the barge antenna BAH, and the latitudes of the two transponders XLAT1 and XLAT2.

The ranges R1 and R2 may then be corrected for greater accuracy by applying the calibration factor REFRA to both ranges R1 and R2 to correct for errors due to the possible variations of the refractivity of the atmosphere from a predetermined standard value. The calibration factors T1C and T2C may be used, respectively, to correct the ranges R1 and R2 for any errors introduced by the respective transponders. In addition since the ranges required by the computer 14 to compute the barge position must be measured within the reference plane of the selected navigational coordinate system, a further correction utilizing the signals T1H T2H and BAH may be made for differences between the transponder and barge antenna height. The signal XLAT1 and XLAT2 may be used to correct for any nsponder height errors caused by the curvature of the earth.

Each of the above corrections may be made in a manner well known in the navigation and range measurement art and may be accomplished by conventional computer programming techniques on the computer 14.

The corrected range signals RC1 and RC2 from the range correction computer 102 may then be utilized by the computer 14 in determining the coordinates of actual barge position. This function may be performed by the computer 14 in a functional section represented as the barge position computer 104. The barge position computer 104, in addition to the corrected ranges RC1 and RC2, is provided with the Northing coordinates T1N and T2N and the Easting coordinates T1E and T2E of the transponders. This data may then be utilized to determine the coordinates of the barge position with respect to the predetermined navigational coordinate system by conventional triangulation techniques.

The actual barge position coordinates u and v from the barge position computer 104 may then be utilized to compute and generate plotter command signals for driving the marker or pen 26 and the chart 20 of the incremental digital plotter 18 illustrated in FIG. 1. This latter function may be performed within the computer 14 by a plotter command signal computer and generator 106 to which may be applied, in addition to the barge position coordinates u and v, the side scale factor SSF, the forward scale Factor FSF, the plot step PSTEP, the grid spacing GS of the chart, the Easting coordinates CEI and CEO of the beginning and end points of a respectively predetermined section or leg of the desired course, and the Northing coordinates CNI and CNO respectively of the beginning and end points of the same desired course leg.

The computation may be accomplished in a variety of ways, depending on the manner in which the chart is prepared. The chart may, for example, be provided with grid lines of the predetermined navigational coordinates system plotted thereon with the particular angular orientation relative to a reference line on the chart, e.g., the center line or one edge of the chart. The desired course, i.e., the predetermined pipeline route, may then be plotted relative to the grid lines thereby providing a graphic display of the desired course as it would appear on any chart.

When the grid lines are plotted in this manner, the computer need only be provided with data as to the coordinates of the beginning of the desired course and the angular orientation of the grid lines on the chart relative to the X and Y axes of the plotter, i.e., the axis perpendicular to the longitudinal axis of the plotter and the axis parallel to the longitudinal axis of the plotter, respectively. Given this information and the computed coordinates u and v of the actual barge position, the computer may determine the distances and directions relative to the X and Y axes of the plotter from the coordinates of the beginning of the desired course, or from any other predetermined coordinates, to the coordinates of the actual barge positions. These calculations may, of course, be accomplished utilizing conventional trigonometric techniques.

Once the distances between the coordinates of the beginning of the desired course and the computed coordinates of the actual position of the barge along the X and Y axes of the plotter have been computed, actual barge position may be plotted. The scale factors SSF, FSF, and GS utilized in preparing the chart, as well as the distance that the pen and chart move for one plot step or increment PSTEP, may be supplied as data to the computer 14, and the computer 14 may calculate the number of pulses which must be applied to the pen stepping motor 200 and the chart stepping motor 202 of the digital incremental plotter 18 to position the pen at the proper X and Y positions on the chart.

For example, assume that the computer has calculated the coordinates of the actual barge position as being two meters from the beginning of the desired course along the Y axis of the plotter and one meter from the beginning of the desired course along the X axis of the plotter. Assume, further, that the side scale factor SSF and the forward scale factor FSS are both equal, e.g., one inch equals 5 meters, and that the plot PSTEP is 1/100 inch, i.e., 100 pulses equal 1 inch. The computer 14 may thus generate a Y signal of 40 pulses and an X signal of 20 pulses of the required polarity to position the pen and chart, respectively, so that the pen is at the calculated X, Y position.

After the barge position has been plotted in this manner, a new barge position may be calculated after a predetermined time interval or when the barge has moved a predetermined distance from the last plotted position. Since the coordinates of the last plotted position may be stored in computer memory, the calculation of the distances to subsequent computed coordinates of actual barge positions along the X and Y axes of the plotter may continue at predetermined intervals until the end of the desired course has been reached.

A conventional chart has been utilized in the above description in order to facilitate an understanding of the plotter command signal computer and generator 106. However, the chart employed in the preferred embodiment of the present invention, as will subsequently be described in more detail, is preferably prepared by dividing the desired course into a plurality of substantially straight-line segments and plotting the segments end-to-end as a substantially continuous straight line parallel to the longitudinal axis of the chart. The grid lines of the predetermined navigational coordinate system may then be plotted relative to each segment of the desired course. Since the desired course appears as a unidirectional line on the chart, i.e., a line without changes in course direction, the orientation of the grid lines may vary relative to a predetermined reference line on the chart for each new desired course segment, assuming that each segment represents a change in the direction of the desired course.

The plotter command signals X and Y generated by the plotter command signal computer and generator 106 may be applied to the input terminals 108 and 110 respectively of the digital plotter 18 to drive a pen stepping motor 200 and a chart stepping motor 202 to position the pen relative to the chart at the coordinates of the actual barge position on the chart. Additionally, pen command signals PENUP and PENDN may be applied to an input terminal 112 of the digital recorder 18 to drive a pen controller 203 to raise the pen out of contact with the chart when in motion and to lower the pen for position plotting as will subsequently be described.

As previously described, it is possible to compute and generate plotter command signals so long as the orientation of the grid line relative to the X and Y axis of the plotter and the appropriate scale factors are supplied as data to the computer. In utilizing the preferred chart of the present invention, the computer is provided with the coordinates of the beginning and end points of the first desired course segment, i.e., CEI and CNI, the Easting and Northing coordinates, respectively, of the beginning of the desired course segment, and CEO and CNO, the Easting and Northing coordinates, respectively, of the end of the desired course segment. Since the coordinates of two points on the desired course segment are supplied to computer 14, the orientation of the grid lines on the chart relative to the desired course segment may be computed utilizing conventional trigonometric techniques.

Further, since the desired course segment, or at least the beginning and end points of the desired course segment, are on a line parallel to the Y axis of the plotter, the orientation of the grid lines relative to the Y axis of the plotter is the same as the orientation of the grid lines relative to a line drawn between the beginning and end coordinates of the desired course segment. Thus, the computer 14 may determine the orientation of the grid lines relative to the axes of the plotter and may plot actual barge positions at the coordinates thereof. However, when the end of a desired course segment is reached, the computer must be provided with new segment data to calculate the orientation of the grid lines of the next desired course segment relative to the desired course prior to continuing the plotting operation.

A determination that the barge has reached the end of a desired course segment may be made automatically by comparing the coordinates of the last-plotted barge position with the coordinates of the end of the desired course segment, or manually by the operator.

Thus, at the end of any desired course segment, the operator may place the pen of the plotter at the beginning of the new desired course segment and supply new course segment coordinates to the computer 14. The previously described operation may then be repeated for any number of desired course segments until the end of the desired course is reached.

In addition to the above, the plotter command signal computer and generator 106 may provide pen command signals PENUP and PENDN to raise and lower the pen. For example, before applying the pen and chart command signals X and Y to the plotter 18, the computer 14 may be programmed to provide a PENUP signal to the input terminal 112 of the pen controller 203 to raise the pen. After the pen and chart have been moved to position the pen at a new set of actual barge position coordinates, the computer 14 may be programmed to provide a PENDN signal at the input terminal 112 of the plotter 18 commanding the pen controller 203 to lower the pen for plotting. The programming of the computer 14 to provide the PENUP and PENDN signals is well within the state of the art and may be effected in any conventional manner.

When the pen is lowered for position plotting, the plotter command signal computer and generator 106 may also provide a predetermined signal pattern to move the pen and chart in a predetermined manner to thereby plot a particular symbol at the coordinates of actual barge position. For example, the pattern may be such that an X is plotted at the computed coordinates until the coordinates of a fitting are reached.

At this point, in addition to the printing of the ranges to the transponders by the teleprinter as previously described, the plotter command signal computer and generator 106 may provide a different signal pattern. Thus, a different symbol may be plotted at the coordinates of the position of a fitting to identify the fitting position on the chart at a later date.

While the computer has been broken down into the above-described functional components in order to facilitate an understanding of the operation thereof, the computer 14 is preferably a single, general purpose digital computer properly programmed to accomplish the above results. The data supplied to the computer 14, with the exception of the range data, may be provided by way of any conventional input device, such as a card reader, tape reader, or the like as previously described. This data may be stored in the computer memory or on tape for later recall when needed for a particular purpose.

The recall and use of the data in the desired calculations may, of course, be controlled by any suitable computer program capable of performing the previously described function. Such programs are well within the scope of an experienced computer programmer, given the above functional description of the operation of the computer, its peripheral equipment, and the knowledge of one skilled in the arts relating to navigational position determining and plotting.

THE PLOTTER

Figure 4:
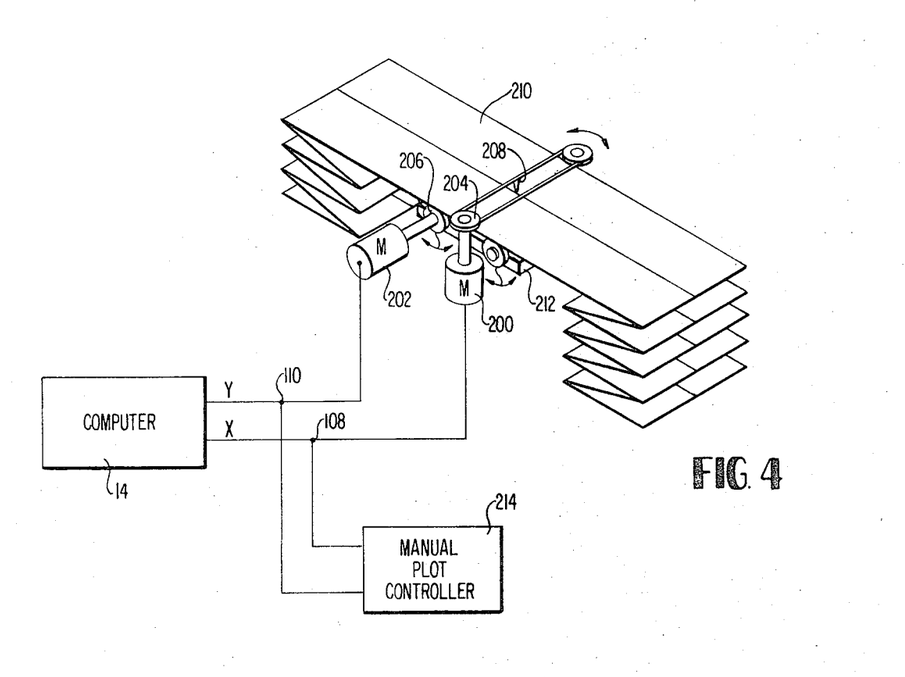
FIG. 4 is a functional diagram of the preferred plotter illustrated in FIG. 1.

The plotter of the present invention is preferably an incremental digital plotter having a horizontal table or bed 212 which provides a stationary, planar surface over which the elongated web or chart 210 may be advanced, such as the model DP1-1 plotter manufactured by Houston Instruments. Referring now to FIG. 4 wherein the plotter utilized in the present invention is illustrated functionally, the plotter command signals X and Y may be applied by way of the input terminals 108 and 110 to stepping motors 200 and 202, respectively. The stepping motors 200 and 202 may be connected respectively in a conventional manner to a pen drive assembly 204 and a web or chart drive assembly 206. The rotary movement of the motor 200 is converted into linear movement of the pen 208 along the X axis of the plotter, i.e. along a line perpendicular to the longitudinal axis of the plotter. Similarly, the rotary movement of the motor 202 is converted into a linear movement of the chart 210 along the Y axis of the plotter, i.e. along a line parallel to the longitudinal axis of the plotter.

A manual plot controller 214 may also be connected to the input terminals 108 and 110 of the plotter to provide manual control thereof.

In operation, the pen 208 may conveniently be positioned at the beginning of the desired course segment by the operation, by means of the manual plot controller 214. The operator may then depress a switch signifying that the pen 208 is in position at the ginning of a particular desired course segment and tiating the position plotting program of the computer The necessary data, if not already in computer memory, may be read into the computer and a first set range values may likewise be accepted. The computer 14 may then calculate the number of pulses which must be applied to the stepping motors 200 and 202 of the plotter to position the pen 208 at the calculated actual barge position on the chart.

A first group of pulses related in number to the distance from the present pen position to the X coordinate of the barge position on the chart 210 may be applied to the motor 200 to position the pen at the X coordinate of actual barge position. A second group of pulses related in number to the distance from the present pen position to the computed Y coordinate of the actual barge position on the chart 210 may be applied to the motor 202 to advance the chart 210 so that the pen 208 is directly over the computed Y coordinate of the actual barge position. When the pen is in position, additional plotter command signals may be applied to the stepping motors 200 and 202 to plot a predetermined symbol at that point on the chart 210.

Although not illustrated in FIG. 4, the computer 14 may also provide a PENUP signal to raise the pen 208 during the positioning of the pen 208 and the chart 210, and a PENDN signal to lower the pen 208 to perform the plotting operation.

While the incremental plotter of the barge position plotting system of the present invention is preferred, it is to be understood that any suitable incremental plotter utilizing a web or elongated chart, either fan-folded or on rolls, may be satisfactorily employed.

THE CHART

As previously described, the chart utilized in conjunction with the present invention may be prepared in the conventional manner by plotting grid lines of a predetermined navigational coordinate system thereon relative to a predetermined reference line. This reference line may be the center line or one edge of a chart as illustrated in FIG. 5.

Figures 5, 6, 7, 8:
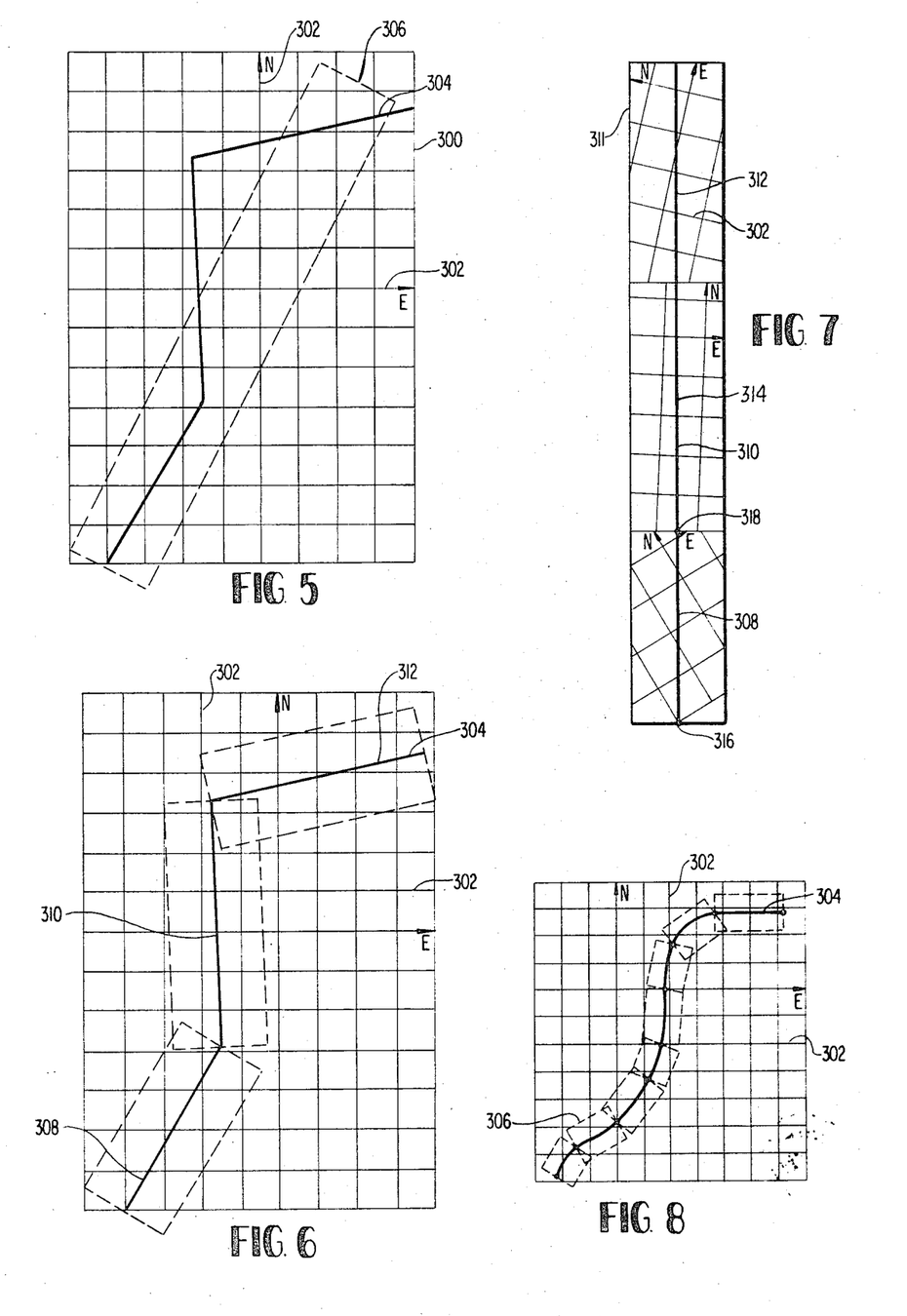
FIG. 5 illustrates a conventional navigational chart.
FIGS. 6-8 are various navigational charts illustrating the construction of a preferred navigational chart utilized in connection with the system of FIG. 1.

With reference to FIG. 5, a chart 300 having grid lines preplotted thereon may suffice for the manual plotting of actual barge positions relative to a preplotted, desired course 304. However, because of the accuracy required and the distances involved, it may be impractical to employ a chart such as that illustrated due to the cumbersome size. The ideal solution is, of course, to plot the desired course 304 on a relatively narrow, elongated chart 306, illustrated in phantom. However, since the desired course 304 may vary erratically in direction, it may be impossible to plot the desired course 304 within the confines of the chart 306 while retaining the scale factors needed for precision. Preparation of the chart as described below provides an excellent solution to this problem.

Referring now to FIG. 6, a preferred chart of the present invention may be prepared by first dividing the desired course 304 into a plurality of substantially straight-line segments 308, 310, and 312. Each segment may be plotted, as illustrated in FIG. 7, in an end-to-end relation on an elongated chart as a substantially continuous, straight line 314 parallel to the longitudinal axis of the chart 311. The orientation of the grid lines 302 relative to each of the segments 308, 310 and 312 of the desired course is retained and therefore the orientation of the grid lines of each segment relative to a predetermined reference line on the chart 311 may differ substantially as the desired course changes.

While each of the segments 308, 310, and 312 are illustrated ideally as straight lines running between the coordinates of the beginning 316 of a segment 308 and the coordinates of the end 318 of the segment 308, in practice the segments of the desired course 304 may have some curvature, as illustrated in FIG. 8. For example, in the laying of pipelines, it may be desirable to avoid sharp bends in the pipeline because of the extreme mechanical stresses which might result. In this event, the desired course 304 may be divided into any number of small segments to reduce the curvature of any segments. Thus, by using smaller segments, any practical course may be divided into substantially straight segments.

The chart of the present invention may be plotted in the following manner. The desired course 304 may be divided into a plurality of segments, as previously described, and the coordinates of the beginning and end of each segment may then be provided as input data to the computer 14. The operator may then place the pen of the incremental digital plotter at approximately the center of the web or elongated chart disposed thereon, after which he may initiate a program for the plotting of the first segment. The computer, utilizing the coordinates of the beginning and end points of the first segment, may then determine the length of the first segment and determine the number of pulses which must be applied to the chart stepper motor to draw a scaled line of the required length on the chart. A line representing the first segment of a desired course may then be drawn by advancing the chart and the chart thereafter returned to its initial position.

The computer may then determine the orientation of the grid lines relative to the first segment of the desired course. The grid lines may then be drawn, and at the completion of the last grid line, the pen may be positioned automatically or by the operator, at the coordinate of the beginning of the next desired course segment, at which time the process is repeated utilizing the coordinate data for the next segment of the desired course. The grid lines need not be actually drawn on the chart except for manual verification of barge position by the operator or to facilitate the later reading of the chart.

The course data utilized in preparing the chart 311 may, of course, be stored in computer memory for later use in plotting the actual barge positions, or may alternatively be stored on punched cards or tape. Additionally, it should be apparent that the order of plotting the desired course line and the grid lines may be reversed if desired.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come

What is claimed is:

1. Apparatus for computing and plotting the position of a vessel relative to a predetermined course comprising:

a plurality of remote microwave transponders each having a known geographical location and adapted to transmit radio signals at predetermined microwave frequencies when triggered; and a pipelaying barge including:

transmitter means for triggering each of said remote transponders at predetermined time intervals;

receiver means for receiving the signals transmitted by said transponders;

first computing means responsive to said transmitter means and said receiver means for computing the ranges from the barge to each of said transponders;

means for storing data;

second computing means responsive to said first computing means and said data storing means for correcting the ranges to each of said transponders for inaccuracy related to the refractivity of the atmosphere and for correcting the ranges to each of said transponders to a predetermined reference plane;

third computing means responsive to said data storing means and said second computing means for computing the coordinates of said barge in a predetermined navigational co-ordinate system;

an incremental digital plotter having an elongated chart adapted for movement along a line parallel to the longitudinal axis thereof and having a marker adapted for movement along a line perpendicular to the longitudinal axis of said chart, said chart having said predetermined course preplotted thereon as a plurality of substantially contiguous straight line segments substantially parallel to the longitudinal axis of said chart and approximately centered thereon;

fourth computing means responsive to said data storing means for determining the orientation of the grid lines of a predetermined navigational coordinate system relative to each of said segments;

means for positioning said marker on said chart at the coordinates of a first point on said predetermined course;

fifth computing means responsive to said data storing means and said third and fourth computing means for calculation the distance along the longitudinal axis of said chart and along a line perpendicular thereto between the coordinates of said first point and the computed coordinates of said barge;

means responsive to said fifth computing means and said data storing means for generating first and second groups of electrical pulses related in number to said calculated distances; and means responsive respectively to said first and second groups of pulses for moving said chart and said marker to position said marker at the computed coordinates of the vessel.

2. A method of determining the position of vessel means relative to a predetermined offshore course, said method comprising:

providing plotter means on offshore vessel means, with said plotter means having movable marker means;

providing movable chart means in said plotter means, with said chart means having a desired course preplotted thereon in the form of a plurality of substantially contiguous line segments of a desired offshore course of vessel means, said course line segments being disposed in sequence along a portion of said chart means and a plurality of segments of grid lines separately oriented relative to at least some of said course line segments.

at least one of said grid line segments being associated with at least one of said desired course line segments and being oriented in an orientation relative to said chart means different from that of another adjacent one of said grid line segments, with said different orientations of said one and other grid line segments being operable to reduce the width of said portion of said chart means having preplotted thereon said one course line segment and another course line segment associated with said other grid line segment;

effecting said different orientations by orienting grid line segments associated with at least two adjacent course line segments in relative inclination, with the grid line pattern of one grid line segment associated with one of said at least two adjacent course line segments being inclined relative to the grid line pattern of another grid line segment associated with another of said at least two adjacent course line segments and being displaced from alignment with a projection of the grid line pattern of said other grid line segment;

said relative inclination between said two adjacent grid line segments resulting from different orientations of said one and said other grid line segment produced by rotation of one of said one and other grid line segments relative to a projection of the other of said one and other grid line segments;

arranging the course line segments of said at least two adjacent course line segments in generally end-to-end relation, extending between lateral boundaries separated by a distance less than distance between lateral boundaries of said at least two course line segments which would result if said at least two course line segments were plotted on grid pattern comprising said one grid line segment and a projection thereof;

said lesser distance between said lateral boundaries being a consequence of said relative inclination of grid line segments associated with said at least two course line segments; and said preplotted desired course, including said at least two course line segments, more closely approaching a generally straight line configuration than would result from the plotting of said at least two course line segments on a grid line pattern corresponding to that of said one grid line segment and a projection thereof;

moving said chart means and marker means to position said marker means on said chart means at coordinates of the actual positions of the vessel means in each of said one and other, differently oriented, grid line segments; and manipulating said vessel means as determined by said positioning of said marker means on said chart means in relation to said preplotted desired course, to tend to cause said actual positioning of said vessel means to tend to bear a desired coincidence with said preplotted course.

3. A method as described in claim 2:

wherein said chart means has a longitudinal axis and is moved longitudinally thereof; and wherein said desired course is related to a predetermined, underwater pipeline route and is preplotted on said chart means as a plurality of substantially contiguous, straight line, desired course line segments substantially parallel to a longitudinal axis of said chart means and approximately centered thereon.

4. A method as described in claim 2 further comprising:

determining ranges from said vessel means to a plurality of known geographical locations remote from said vessel means, by providing microwave transponder means at each of said known geographical locations for transmitting electromagnetic wave energy at a predetermined microwave frequency when triggered, from said vessel means, triggering said transponder means at predetermined intervals, on said vessel means, receiving the energy transmitted by said transponder means, and responsive to said received energy, determining the range to each of said transponder means;

computing and generating digital plotter command signals by providing means for storing data, including information relating to said different orientations of said one and other grid line segments, and said determinations of ranges to each of said transponder means as determined by said range determining means, and said geographical locations, responsive to said data storing means, computing the coordinates of said vessel means in a predetermined navigational coordinate system, responsive to said data storing means and said coordinate computing means, generating digital plotter command signals;

providing in said plotter means incremental digital plotter means on said vessel means, operable in response to said digital plotter command signals to generate marker means manipulating signals;

providing in said chart means a longitudinal axis and moving said chart means longitudinally thereof; and responsive to said marker means manipulating signals, positioning said marker means on said chart means at computed coordinates of said vessel means.

5. A method as described in claim 4 wherein said desired course is preplotted by:

providing discrete chart segments;

determining the orientation of grid lines of a predetermined navigational coordinate system relative to line segments of said desired course;

plotting said one desired course line segment on one chart segment;

plotting said one grid line segment of said coordinate system on said one chart segment adjacent said one desired course line segment in accordance with said determination of the orientation of grid lines relative to line segments of said desired course;

plotting said other course line segment on another chart segment, with said other desired course line segment being substantially contiguous with but displaced longitudinally of said one desired course line segment; and plotting said other grid line segment on said other chart segment adjacent said other desired course line segment in accordance with said determination of the orientation of grid lines relative to line segments of said desired course;

plotting said one and other grid line segments so as to provide said different orientations thereof on said chart means.

6. Apparatus for determining the position of vessel means relative to a predetermined offshore course, said apparatus comprising:

plotter means having movable marker means;

movable chart means included in said plotter means and having a desired course preplotted thereon in the form of a plurality of substantially contiguous line segments of a desired offshore course of vessel means, said course line segments being disposed in sequence along a portion of said chart means, and a plurality of segments of grid lines separately oriented relative to at least some of said course line segments, at least one of said grid line segments being associated with at least one of said desired course line segments and being oriented in an orientation relative to said chart means different from that of another adjacent one of said grid line segments, with said different orientations of said one and other grid line segments being operable to reduce the width of said portion of said chart means having preplotted thereon said one course line segment and another course line segment associated with said other grid line segment;

said two adjacent grid line segments being associated with at least two adjacent course line segments and being mutually inclined, with the grid line pattern of one grid line segment associated with one of said at least two adjacent course line segments being inclined relative to the grid line pattern of another grid line segment associated with another of said at least two adjacent course line segments and being displaced from alignment with a projection of the grid line pattern of said other grid line segment;

said relative inclination between said two adjacent grid line segments resulting from different orientations of said one and said other grid line segments produced by rotation of one of said one and other grid line segments relative to a projection of the other of said one and other grid line segments;

the course line segments of said at least two adjacent course line segments being arranged in generally end-to-end relation and extending between lateral boundaries separated by a distances less than a distance between lateral boundaries of said at least two course line segments which would result if said at least two course line segments were plotted on a grid pattern comprising said one grid line segment and a projection thereof;

said lesser distance between said lateral boundaries being a consequence of said relative inclination of grid line segments and associated with said at least two course line segments; said preplotted desired course, including said at least two course line segments, more closely approaching a generally straight line configuration than would result from the plotting of said at least two course line segments on a grid line pattern corresponding to that of said one grid line segment and a projection thereof; and means included in said plotter means for moving said chart means and marker means to position said marker means on said chart means at coordinates of the actual positions of the vessel means in each of said one and other, differently oriented, grid line segments.

7. Apparatus as described in claim 6:
wherein said chart means has a longitudinal axis and is operable to move longitudinally thereof; and
wherein said desired course is related to a predetermined, underwater pipeline route and is preplotted on said chart means as a plurality of substantially contiguous, straight line, desired course segments substantially parallel to a longitudinal axis of said chart means and approximately centered thereon.

8. Apparatus as described in claim 6:
wherein said apparatus includes range determining means for determining ranges from said vessel means to a plurality of known geographical locations remote from said vessel means, said range determining means including
microwave transponder means at each of said known geographical locations for transmitting electromagnetic wave energy at a predetermined microwave frequency when triggered,
means on said vessel means for triggering said transponder means at predetermined intervals,
means on said vessel means for receiving the energy transmitted by said transponder means, and
means on said vessel means responsive to said received energy for determining the range to each of said transponder means;
wherein said apparatus includes digital computing means on the vessel means for computing and generating digital plotter command signals, said digital computing means including
means for storing data, including information relating to said different orientations of said one and other grid line segments, and said determinations of ranges to each of said transponder means as determined by said range determining means, and said geographical locations,
means responsive to said data storing means for computing the coordinates of said vessel means in a predetermined navigational coordinate system, and
means responsive to said data storing means and said coordinate computing means for generating digital plotter command signals;
wherein said plotter means includes
incremental digital plotter means on said vessel means, operable in response to said digital plotter command signals to generate marker means manipulating signals;
wherein said chart means has a longitudinal axis and is operable to move longitudinally thereof; and
wherein said means for moving said chart means and said marker means includes
means for moving said chart means along a line parallel to said longitudinal axis thereof, and
means responsive to said marker means manipulating signals for positioning said marker means on said chart means at computed coordinates of said vessel means.

9. An apparatus as described in claim 8 in combination with preplotting means operable to preplot said desired course, said chart preplotting means including:
discrete chart segments;
means for determining the orientation of grid lines of a predetermined navigational coordinate system relative to line segments of said desired course;
means for plotting said one desired course line segment on one chart segment;
means for plotting said one grid line segment of said coordinate system on said one chart segment adjacent said one desired course line segment in accordance with operation of said means for determining the orientation of grid lines relative to line segments of said desired course;
means for plotting said other desired course line segment on another chart segment, with said other desired course line segment being substantially contiguous with but displaced longitudinally of said one desired course line segment; and
means for plotting said other grid line segment on said other chart segment adjacent said other desired course line segment in accordance with operation of said means for determining an orientation of grid lines relative to line segments of said desired course;
said one and other grid line segments having said different orientation on said chart means.

10. Apparatus for computing and plotting the position of a pipelaying barge relative to a predetermined underwater pipeline route comprising:
a plurality of remote microwave transponders each having a known geographical location and adapted to transmit radio signals at predetermined microwave frequencies when triggered; and
a pipelaying barge including
transmitter means for triggering each of said remote transponders at predetermined time intervals,
receiver means for receiving the signals transmitted by said transponders,
first computing means responsive to said transmitter means and receiver means for computing the ranges from the barge to each of said transponders, means for storing data, second computing means responsive to said data storing means and said first computing means for computing the coordinates of said barge in a predetermined navigational coordinate system, said second computing means including first means responsive to said first computing means and said data storing means for correcting the ranges to each of said transponders for inaccuracy related to the refractivity of the atmosphere, and second means responsive to said first means and said data storing means for correcting the ranges to each of said transponders to a predetermined reference plane, an incremental digital plotter having an elongated chart adapted for movement along a line parallel to the longitudinal axis thereof and having a marker adapted for movement along a line perpendicular to the longitudinal axis of said chart, means for positioning said marker on said chart at the coordinates of a first point on said predetermined pipeline route, third computing means responsive to said data storing means and said second computing means for calculating the distance along the longitudinal axis of said chart and along a line perpendicular thereto between the coordinates of said first point and the computed coordinates of said barge, means responsive to said third computing means and said data storing means for generating first and second groups of electrical pulses related in number to said calculated distances, and means responsive respectively to said first and second groups of pulses for moving said chart and said marker to position said marker at the computed coordinates of the barge.

11. Apparatus of claim 10 wherein:

said representation of said predetermined underwater pipeline route is preplotted on said chart as a plurality of course line segments; and said apparatus further includes means for determining the orientation of grid line segments of a predetermined navigational coordinate system associated with said course line segments;

the grid line segments associated with at least two adjacent course line segments are mutually inclined, with the grid line pattern of one grid line segment associated with one of said at least two adjacent course line segments being inclined relative to the grid line pattern of another grid line segment associated with another of said at least two adjacent course line segments and being displaced from alignment with a projection of the grid line pattern of said other grid line segment;

the course line segments of said at least two adjacent course line segments are arranged in generally end-to-end relation and extend between lateral boundaries separated by a distance less than a distance between lateral boundaries of said at least two course line segments which would result if said at least two course line segments were plotted on a grid pattern comprising said one grid line segment and a projection thereof;

said lesser distance between said lateral boundaries is a consequence of said relative inclination of grid line segments associated with said at least two course line segments; and said preplotted route, including said at least two course line segments, more closely approaches a generally straight line configuration than would result from the plotting of said at least two course line segments on a grid line pattern corresponding to that of said one grid line segment and a projection thereof.

12. Apparatus for computing and plotting the position of a pipelaying barge relative to a predetermined underwater pipeline route comprising:

range determining means for determining the ranges from the barge to a plurality of known geographical locations remote from the barge, said range determining means including a microwave transponder at each of said known geographical locations for transmitting electromagnetic wave energy at a predetermined microwave frequency when triggered, means on the barge for triggering said transponders at predetermined intervals, means on the barge for receiving the energy transmitted by said transponders, and means on the barge for determining the ranges to each of said transponders;

digital computing means on the barge for computing and generating digital plotter control signals including means for storing data, first means responsive to said data storing means and said range determining means for correcting the ranges to each of said transponders for inaccuracy related to the refractivity of the atmosphere, second means responsive to said first means and said data storing means for correcting the ranges to each of said transponders to a predetermined reference plane, means responsive to said data storing means for computing the coordinates of the barge in a predetermined navigational coordinate system, and means responsive to said data storing means and said coordinate computing means for generating digital plotter command signals, said means for generating digital plotter command signals including means for generating an electrical signal for selectively lowering and raising said marker into and out of contact with said chart; and an incremental digital plotter on the barge for plotting the position of the barge relative to the predetermined underwater pipeline route including a chart adapted for movement along a line parallel to the longitudinal axis thereof and having the predetermined pipeline route and a plurality of grid lines of said predetermined navigational coordinate system plotted thereon, a marker adapted for movement along a line perpendicular to the longitudinal axis of said chart, and means responsive to said plotter command signals for positioning said marker at the computed coordinates of the barge by movement of said chart and said marker.

13. Apparatus of claim 12 wherein said predetermined underwater pipeline route is preplotted on said chart as a plurality of substantially contiguous straight line segments substantially parallel to the longitudinal axis of said chart and approximately centered thereon, and wherein said digital computing means includes means for determining the orientation of the grid lines of a predetermined navigational coordinate system relative to each of said segments.

14. A method of plotting the position of a vessel relative to a desired course comprising the steps of:
   a. generating at predetermined intervals electrical signals representative of the ranges from the vessel to each of a plurality of transponders, each located at a predetermined geographical position;
   b. providing means for storing data;
   c. modifying the generated electrical signals responsively to the stored data to correct for inaccuracy related to atmospheric conditions;
   d. further modifying the generated electrical signals responsively to the stored data to provided electrical signals representative of the ranges in a predetermined reference plane from the vessel to each of the plurality of the transponders;
   e. determining the navigational coordinates of the position of the vessel responsively to the further modified generated electrical signals;
   f. providing a plotter having a marker movable laterally with respect to the longitudinal axis of the bed of said plotter;
   g. providing a chart movable longitudinally with respect to the plotter, the chart having a line representative of the desired course preplotted thereon as a plurality of contiguous straight line segments substantially parallel to the longitudinal axis of said chart and approximately centered on said chart and a plurality of grid lines separately oriented relative to each of the segments;
   h. translating the determined navigational coordinates into command signals relative to distance on the chart along the longitudinal and transverse axis of the plotter for a given segment of the course; and
   i. moving the chart and the marker responsively to the command signals.

15. A method of working with a pipeline offshore, said method comprising:
   providing pipeline working vessel means operable to work with an at least partially submerged pipeline at an offshore location;
   generating electrical signals representative of the ranges from said pipeline working vessel means to each of a plurality of transponders, each located at a predetermined geographical position,
   providing position plotting means carried by said pipeline working vessel means and containing a preplotted course related to a predetermined position of said pipeline;
   determining, on said pipeline working vessel means, an actual offshore position of said pipeline working vessel means during the performing of work relating to said pipeline;
   said determining of an actual offshore position of said pipeline working vessel means being effected by
      providing means on said pipeline working vessel means for storing data,
      modifying said generated electrical signals on said pipeline working vessel means responsively to said stored data to correct for inaccuracy related to atmospheric conditions,
      further modifying said generated electrical signals on said pipeline working vessel means responsively to said stored data to provide electrical signals representative of the ranges, in a predetermined reference plane, from the vessel means to each of said plurality of said transponders, and
      on said pipeline working vessel means, determining the navigational coordinates of an actual position of said pipeline working vessel means responsively to said further modified generated electrical signals;
   visually indicating on said plotting means an indication of said predetermined position of said pipeline relative to an actual position of said pipeline working vessel means as determined by said navigational coordinates;
   performing work on said pipeline from said pipeline working vessel means, with said pipeline working vessel means floating on a body of water and with at least a portion of said pipeline being disposed on a submerged location spaced from said pipeline working vessel means; and
   while performing work on said pipeline from said pipeline working vessel means, operating said pipeline working vessel means in accordance with said visual indication of said predetermined position of said pipeline relative to said pipeline working vessel means so as to cause the actual location of said pipeline working vessel means to tend to bear a desired coincidence with said predetermined pipeline position.

16. Apparatus for working with a pipeline offshore, said apparatus comprising:
   pipeline working vessel means operable to work with an at least partially submerged pipeline at an offshore location;
   a plurality of remote transponders each having a known geographical location and adapted to transmit radio signals at predetermined microwave frequencies when triggered;
   position plotting means carried by said pipeline working vessel means and containing a preplotted course related to a predetermined position of said pipeline;
   pipeline working position determining means located on said pipeline working vessel means, and operable to determine an actual offshore position of said pipeline working vessel means during the performing of work relating to said pipeline;
   said pipeline working position determining means including transmitter means for triggering each of said remote transponders at predetermined time intervals,
receiver means for receiving the signals transmitted by said transponders,
computer means including first means responsive to said transmitter means and receiver means for computing the ranges from the barge to each of said transponders,
means for storing data,
said computer means including second means responsive to said data storing means and said first means of said computer means for computing the coordinates of an actual position of said barge in a predetermined navigational coordinate system, said second means of said computer means including
atmosphere correction means responsive to said first means of said computer means and said data storing means for correcting the ranges to each of said transponders for inaccuracy related to the refractivity of the atmosphere, and
reference plane correction means responsive to said atmosphere correction means and said data storing means for correcting the ranges to each of said transponders to a predetermined reference plane;
visual indicating means included in said plotting means and operable to visually indicate said predetermined position of said pipeline relative to an actual position of said pipeline working vessel means as determined by said pipeline working position determining means;
pipeline working means comprising said pipeline working vessel means for performing work on said pipeline, with said pipeline working vessel means floating on a body of water and with at least a portion of said pipeline being disposed on a submerged location spaced from said pipeline working vessel means; and means operable, while performing work on said pipeline with said pipeline working means, to operate said pipeline working vessel means in accordance with said visual indication of said predetermined position of said pipeline relative to said pipeline working vessel means so as to cause the actual location of said pipeline working vessel means to tend to bear a desired coincidence with said predetermined pipeline position.

* * * * *